(12) United States Patent
Hussain (10) Patent No.: US 7,788,401 B2
(45) Date of Patent: Aug. 31, 2010

(54) OPERATIONS SWITCHES AND SYSTEMS FOR PROVIDING OPERATIONS SERVICE FOR NETWORKS

(75) Inventor: Altaf Hussain, Alpharetta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 971 days.

(21) Appl. No.: 11/314,982

(22) Filed: Dec. 21, 2005

(65) Prior Publication Data

US 2006/0288118 A1    Dec. 21, 2006

Related U.S. Application Data

(60) Provisional application No. 60/690,589, filed on Jun. 15, 2005, provisional application No. 60/690,577, filed on Jun. 15, 2005.

(51) Int. Cl.
*G06F 15/173* (2006.01)
*G06F 9/46* (2006.01)

(52) U.S. Cl. .................................. 709/238; 718/102

(58) Field of Classification Search ................ 709/238; 718/2, 120
See application file for complete search history.

(56) References Cited

U.S. PATENT DOCUMENTS

| | | | |
|---|---|---|---|
| 5,644,354 A * | 7/1997 | Thompson et al. | ........... 725/138 |
| 6,081,518 A | 6/2000 | Bowman-Amuah | |
| 6,988,249 B1 | 1/2006 | Arvanitis et al. | |
| 7,020,697 B1 | 3/2006 | Goodman et al. | |
| 7,085,279 B1 | 8/2006 | Kumar et al. | |
| 7,403,946 B1 | 7/2008 | Taylor | |
| 7,415,509 B1 | 8/2008 | Kaltenmark et al. | |
| 7,454,755 B2 * | 11/2008 | Jacobs et al. | ................. 718/105 |
| 2003/0212991 A1 * | 11/2003 | Mahajan | ..................... 717/177 |
| 2005/0198231 A1 * | 9/2005 | Gasca et al. | ................. 709/221 |
| 2006/0013147 A1 * | 1/2006 | Terpstra et al. | .............. 370/252 |
| 2006/0117092 A1 | 6/2006 | Yanagi et al. | |
| 2007/0171923 A1 | 7/2007 | Eisner et al. | |

OTHER PUBLICATIONS

U.S. Appl. No. 11/314,937, filed Dec. 21, 2005.
Office Action dated Sep. 11, 2008; U.S. Appl. No. 11/314,937.
Office Action dated Mar. 3, 2009; U.S. Appl. No. 11/314,937.

\* cited by examiner

*Primary Examiner*—Nathan Flynn
*Assistant Examiner*—Chirag R Patel
(74) *Attorney, Agent, or Firm*—Parks IP Law LLC; Jennifer P. Medlin, Esq.

(57) ABSTRACT

A centralized point of management, such as an operations switch, is established for operations services being provided by operations service servers for various customer networks. The centralized point of control may include an application server for providing operations service management where the application server maintains databases for establishing customer subscriptions by associating customer networks with operations services being provided by operations service servers. The centralized point of control may further include a network server for routing communications with the operations service servers and one or more media servers for interfacing with customers to allow for selection and control of operations services.

20 Claims, 6 Drawing Sheets

OPERATIONS SWITCHES AND SYSTEMS FOR PROVIDING OPERATIONS SERVICE FOR NETWORKS

RELATED APPLICATIONS

The present application claims priority to U.S. Provisional Application 60/690,589 filed on Jun. 15, 2005, and entitled "IP Operations Management Services to Support Operations Services or Feature Packages," which is incorporated herein, and the present application claims priority to U.S. Provisional Application 60/690,577 filed on Jun. 15, 2005, and entitled "Operations Switch—A New Technology to Support Operations Services or Feature Packages," which is incorporated herein.

TECHNICAL FIELD

The present application relates to provisioning operations service for networks. More particularly, the present application relates to provisioning of operation services by utilizing an operation switch interconnected to operation service servers and networks requiring service.

BACKGROUND

Entities that operate telecommunications and computing networks must monitor and maintain those networks. Such entities include multimedia communication service providers, multimedia communication network providers, enterprise customer services and networks, large/small business services and networks, and consumer services, and home networks. Many of the operating tasks (i.e., provisioning, activating, and monitoring) and maintenance tasks are common among the networks of the various entities. However, each of these entities generally performs the operation and maintenance themselves, using various software tools to complete the operating and maintenance tasks. Often, the entities responsible for the networks develop their own software and maintain personnel responsible for handling the operations services. The computer systems, software tools, and personnel involved in handling the operations services for a network require a significant investment on the part of the each of the entities that own the networks.

When new technology is to be added to the network, the entities are forced to develop new operations support systems or modify existing ones to fully support the new technology. This results in a delay in the implementation of new technology and a delay in the delivery of new services to customers. In this context, customers may include those customers of a service provider network, customers of entities providing service to an enterprise network and/or large/small business network owned by the customer, as well as customers of entities providing service to a consumer/home network. Ultimately, there may be a significant loss of revenue associated with such delays in addition to the costs associated with providing the operations support systems for the new technology.

SUMMARY

Exemplar embodiments address these issues and others by providing a centralized point of management between operations services being provided by operations service servers for various customer networks. The centralized point of control may include one or more application servers for providing operations service management, a network server for routing communications with the operations service servers, and one or more media servers for interfacing with customers to allow for selection and control of operations services.

One embodiment is an operations switch that includes at least one application server that maintains a database of operations service servers and the network address for each, a database of customer networks and the network address for each, and a database of operations services that are available and the operations service servers that provide the operations services. The database of customer networks maintains subscriptions by associating each customer network with the operations services subscribed to by each customer and with the operation service servers providing the operations services for each customer network. The operations switch further includes a network server that routes communications between the application server and each of the operation services servers to initiate operation services and establishes a connection between the operation services servers and the customer networks according to the subscriptions. Additionally, the operations switch includes a media server that provides an interface for receiving communications with customers to provide operation service options for customer networks, to receive a selection of operation services to be provided for customer networks, and to establish a subscription for the customer networks within the customer network database.

Another embodiment is a system that includes an application server that maintains a database of operations service servers and the network address for each, a database of customer networks and the network address for each, and a database of operations services that are available and the operations service servers that provide the operations services. The database of customer networks maintains subscriptions by associating each customer network with the operations services subscribed to by each customer and with the operation service servers providing the operations services for each customer network. A network server routes communications between the application server and each of the operation services servers to initiate operation services and establishes a connection between the operation services servers and the customer networks according to the subscriptions. A media server provides an interface for receiving communications with customers to provide operation service options for customer networks, to receive a selection of operation services to be provided for customer networks, and to establish a subscription for the customer networks within the customer network database. A plurality of operation service servers are in communication with the application server via the network server, wherein the application server is interconnected to a plurality of customer networks, wherein the application server performs operation services management by establishing a communication link between a first operation service server of the plurality and a first customer network upon the application server receiving a request from the first customer network for a service that is provided by the first operations service server.

Another embodiment includes a computer readable medium having instructions to perform acts that include storing a database of operations service servers and the network address for each, a database of customer networks and the network address for each, and a database of operations services that are available and the operations service servers that provide the operations services. The acts further includes storing subscriptions by associating each customer network with the operations services subscribed to by each customer network and with the operation service servers providing the operations services for each customer network. The acts additionally include providing routing instructions to initiate operation services by requesting a connection between the operation services servers and the customer networks according to the subscriptions. Furthermore, the acts include providing an interface for receiving communications with customers to provide operation service options for customer networks, to receive a selection of operation services to be provided for customer networks, and to establish a subscription for the customer networks within the customer network database.

DETAILED DESCRIPTION

Exemplary embodiments provide for the centralized establishment of operations services for customer networks from various operations service providers. An operations switch provides the centralized point of management and is interconnected to the operations service servers and the customer networks. The operations switch establishes communication links between the operations service servers and the customer networks so that operations service requested by customers is provided, and the operations switch provides an interface for customers to access details and otherwise monitor the operations services being provided.

Figure 1:
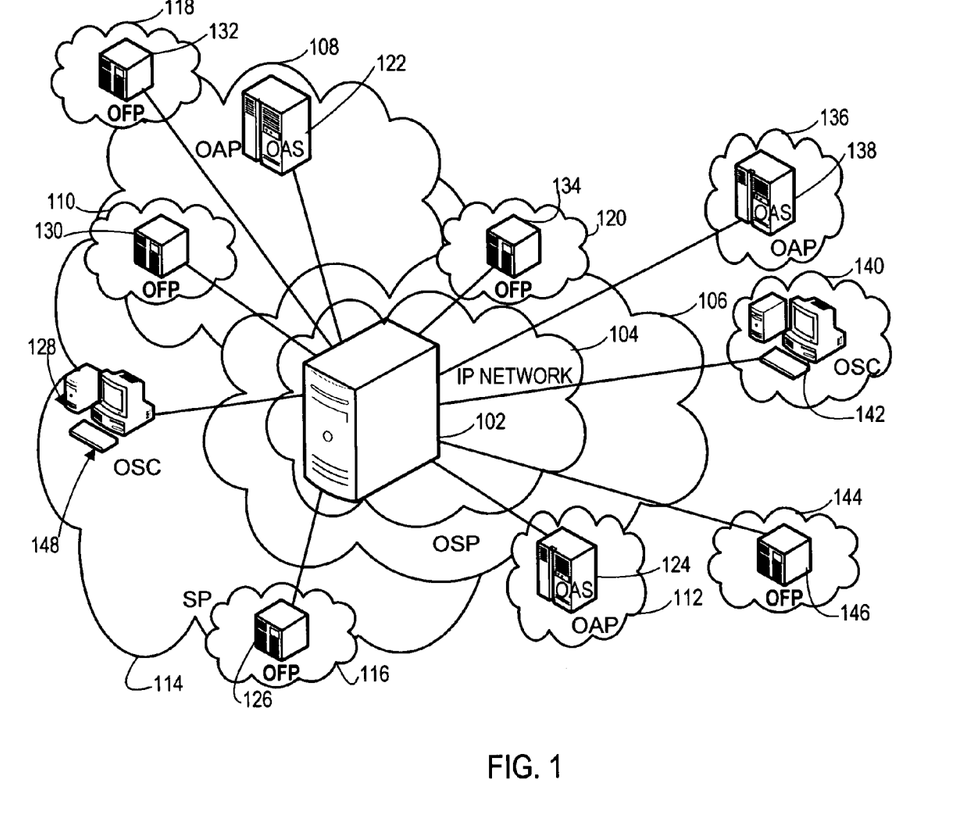
FIG. 1 shows one example of the interconnection of an operations switch to customers and to operations service providers over various overlapping network layers.

FIG. 1 shows one example of the interconnection between an operations switch (OSW) 102 of an operations service provider (OSP) network 106 and operations service servers and customer networks. As can be seen, the OSW 102 serves as a centralized point of control and management for operations services being provided to customers. The OSW 102 as discussed herein may be implemented as an Internet Protocol softswitch such as the Siemens hiQ 8000 and Lucent Network Controller (LNC) manufactured by Siemens and Lucent, respectively and adapted to perform the functions set forth herein. In the embodiment shown in FIG. 1, the OSW 102 resides within an Internet Protocol (IP) network 104 for purposes of communicating with external computer systems including those of customers and external provider entities.

As shown, the OSW 102 interconnects with servers and/or terminals of networks outside the OSP network 106. The OSP network 106 of this embodiment is a network that is owned and operated by the OSP that is providing the OSW 102 for access by customers in order to provide for the establishment of operations services to the customer from operations service servers of other provider entities. Specifically, the OSW 102 acts as a mechanism for establishing operations service between operations service customers (OSC) 140, 148 and the provider entities include operations application providers (OAP) 108, 112, and 136 and operations feature providers (OFP) 110, 116, 118, 120, and 144. Additionally, the OSW 102 may include billing features to monitor the operations services being provided to a customer and to generate billing data based on monitoring of those operations services being provided.

The OSCs 140, 148 are end users needing operations services, such as configuring and monitoring their network, network devices or services at the customer premises. For example, an OSC may be a residential user needing operations services for the network at their home. Likewise, the OSC may be a business user needing operations services for the enterprise or small business network. The operations services may be provided to the network via an operations terminal (OT) 128, 142 located within the network. The OT 128, 142 may be a personal computer or other electronic device capable of exposing the OSC network to external provider networks, such as via voice and/or video. The OT 128, 142 is connected to a provider network via a wide area network and protocol, such as via Internet Protocol routing via a broadband Internet connection.

The OSC network 140 may be a stand-alone network not associated with a particular service provider for establishing network connectivity. For example, the OSC 140 may itself be a service provider that provides network connectivity for its own customers, but for purposes of the current embodiment, the service provider OSC 140 is a customer of the OSP 106 and the provider entities including OAPs and OFPs. Thus, rather than the service provider OSC 140 being required to implement its own operations services to manage its own network, the service provider OSC 140 may rely upon the operations services being provided from the OAPs and OFPs once established by the OSP 106 via the OSC 102.

The OSC network 148 may reside as a node of a service provider (SP) network 114, where the OSC 148 is a customer of the SP 114 while also being a customer of the OSP 106 for purposes of receiving operations services. It will be appreciated that the SP 114 and OSP 106 may merge as one network where the SP and OSP entity is one and the same. The SP 114 may be any service provider, such as a voice over IP (VoIP) provider, a Digital Subscriber Loop (DSL) provider, or any other communications or non-communications provider who may require operations services for its network.

With respect to the operations services to be provided to the OSCs (and/or SPs), operations service servers are present within the networks of the external provider entities. As discussed above, the external providers may include OAPs. Each OAP has one or more operation application servers (OAS) that provide the application functionality of the operations service being subscribed to by a customer of the OSP. As shown OAP 108 operates OAS 122, OAP 112 operates OAS 124, and OAP 136 operates OAS 138. It will be appreciated that the operations application services provided by the OAPs may differ such that the OAP is chosen for a particular customer subscription based on the particular operations application service that it provides, or may be the same such that the OAP is chosen based on some criteria such as price to the customer or commission to be paid to the OSC 106.

Also with respect to the operations services to be provided to the OSCs and/or SPs, the external providers may also include OFPs. Each OFP has one or more operation feature servers (OFS) that provide the feature functionality of the operations service being subscribed to by a customer of the OSP. As shown OFP 110 operations OFS 130, OFP 116 operates OFS 126, OFP 118 operates OFS 132, OFP 120 operates OFS 134, and OFP 144 operates OFS 146. As with the OAPs, it will be appreciated that the operations feature services provided by the OFPs may differ such that the OFP is chosen for a particular customer subscription based on the particular operations feature service that it provides, or may be the same such that the OFP is chosen based on some criteria such as price to the customer or commission to be paid to the OSC 106.

Figure 1B:
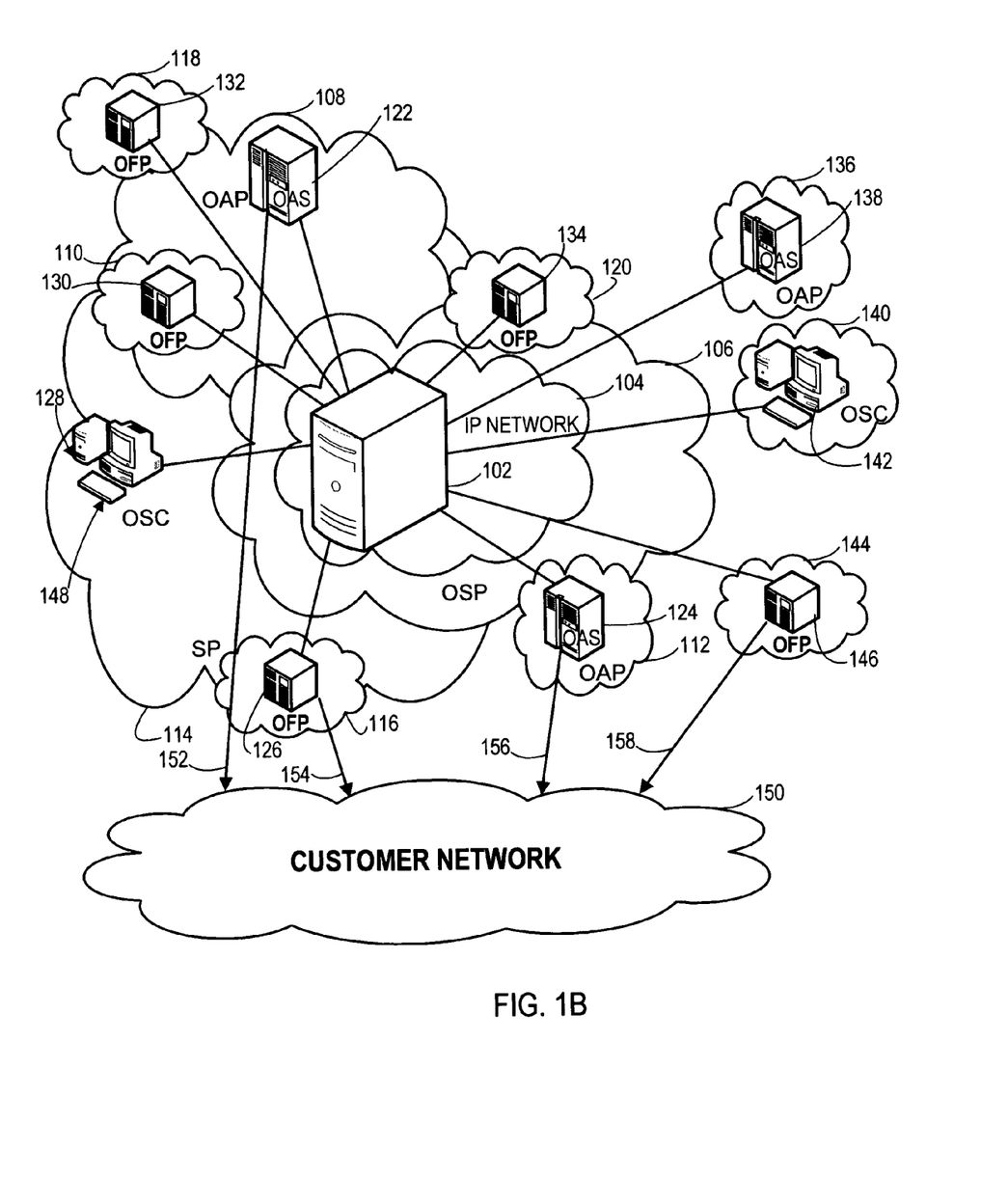
FIG. 1b shows one example of the interconnection of an operations switch to customers and to operations service providers over various overlapping network layers in order to provision operations services for the customers.

As discussed below, the OSW 102 provisions the operations services including operation applications and operation features by receiving requests from the customer via the OT 128 or other computing device and then establishes links between the network of the customer that requires operations services and the operations application servers and operations feature servers. FIG. 1b shows one example where the OSW 102 has received a request from the OT 128 and has responded by: establishing link 152 between customer network 150 and the OAS 122 to provision one or more operation applications, establishing link 154 between customer network 150 and OFS 126 to provision one or more operation features, by establishing link 156 between customer network 150 and OAS 124 to provision one or more other operation applications, and by establishing link 158 between customer network 150 and OFS 146 to provision one or more other operation features.

Many different operations services may be provided. For example, the operation application services of the OAPs may include such things as service ordering applications, where service ordering applications perform tasks including Service Order, Service Fulfillment and Service Activation. The operation application services may further include fault management applications, where fault management applications perform tasks including Monitoring Network Performance (such as performance parameters of individual components or of a network as a whole), Network Capacity (such as capacity of individual components or of a network as a whole) and Network Faults. Additional operation application services may include Capacity Management Applications, Asset/Inventory Management of network equipment as well as provisioning, configuring, and activating of network equipment.

Likewise, the operation feature services of the OFPs, which are ultimately features utilized by applications also being provided to the customers, may include such things as monitoring capacity of a specific network where monitoring capacity involves measuring how much data per unit time can be transferred and may be performed as a subset of a maintenance application such as one being provided by an OAP. The operation feature services may further include monitoring of network equipment of a specific network, where monitoring of network equipment involves determining whether the network equipment has a failed or other status. Additional operation feature services may include Order Activations as part of Configuration management Applications.

The operations services may be common among technologies employed by customers. Thus, the operations applications and features may be configured to address the issues of one technology versus another. Accordingly, the OAPs and OFPs may specialize for the network operations services of particular customer networks implementing particular technologies for which operations services are needed. Furthermore, the OSPs may also specialize for the network operations services of particular industries such that the OAPs and OFPs that the OSPs associate with a customer are those that specialize for the industry to which the customer belongs.

Figure 2:
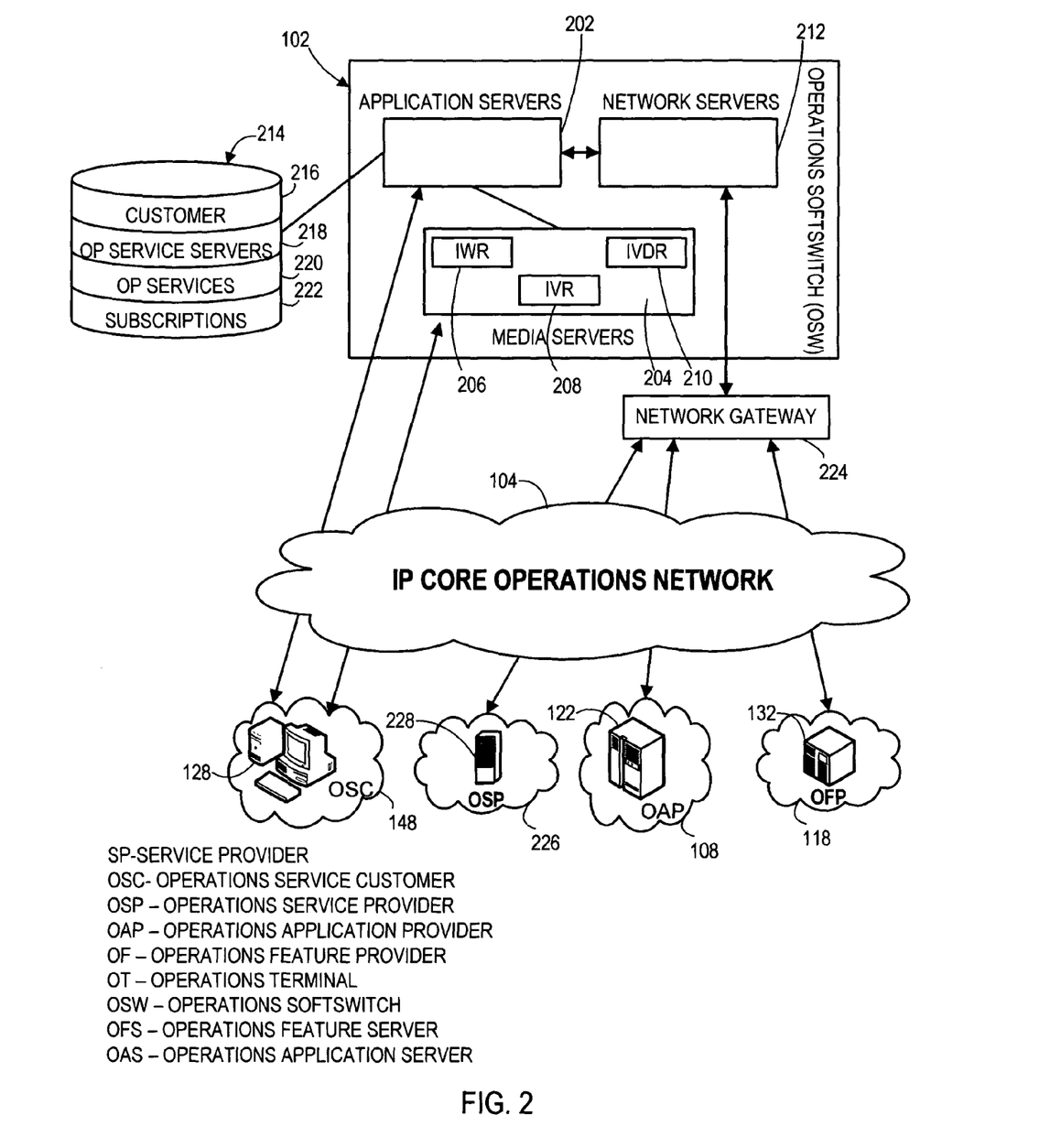
FIG. 2 shows one example of the components of an operations switch of FIG. 1.

FIG. 2 shows one embodiment of OSW 102 in greater detail. The OSW 102 includes three separate servers. A first server is an application server 202. A second server, which may itself include multiple server functions, is a media server 204. A third server is a network server 212. The OSW 102 functions to provide an access interface to the OSCs, to provide a trunk interface to the OFPs, OAPs, and to other OSPs, to interface to various media including voice, video, and data to be used for monitoring of a network and the operations services being provided thereto by a customer, to interface to the customer network or to a service provider network of the customer, and to provide network security features.

The application server 202 operates to establish the subscriptions of customers for the operations services. The application server 202 interacts with the media server 204 to interface with the customers and to allow the customers to make selections for Resource Selection (Centralized Allocation, Geographical Location Selection) and media selection (Voice, Video and/or Web) of operations services and to monitor those operations services being provided. The application server 202 interacts with the network servers 212 to establish the connection between the operations service servers and the OT of the customers so that the operations services can be provided from the operations service servers.

Additionally, the application server 202 maintains one or more databases 214. The one or more databases 214 include a database segment 216 that stores information about the customers of the OSP, including the network address of each of the OTs for which operations service will be provided. The database segment 218 stores information about the operations service servers, and corresponding network addresses, that are available to customers via the OSP including all of the OASs and OFSs of the external providers. The database segment 220 stores the operations services that are available for selection by customers and that are provided by the operations service servers of segment 218, where the operations services may be provided by multiple operation service servers of segment 218 and wherein either the customer or the OSC may choose which operations service server is to be included for the subscription. Database segment 222 stores the subscription associations for each customer, where each subscription associates a customer OT with an operations service server for providing the operations service desired by the customer to the OT and the corresponding customer network.

The application server 202 functions to provide the customer with selections for management services of the operations services being provided, including network configuration, network fault detection, network performance detection, network capacity detection, network security detection (such as monitoring access attempts to a customer network including log-in validation), network account management, and customer installation management. The application server 202 may provide for prioritization of the operations services being provided. Furthermore, the application server 202 may provide for announcements via the media servers 204, including via the web IWR 206, voice IVR 208 or video IVDR 210. Furthermore, the application server 202 may provide prompts and greetings for customers accessing their operation services account, and may provide accounting and billing functions including providing such information to the customer for review.

The media server 204 functions to provide centralized allocation and geographical location selection for customers. Additionally, the media server 204 provides for interactive voice response (IVR 208), interactive video response (IVDR 210), and/or interactive web response (IWR 206) for exchanging information with the customer regarding the operations services being provided, including the operation applications and operation features provided from the provider entities.

The network server 212 functions to provide centralized routing, such as IP routing, including transaction based routing, and policy based control. Specifically, the network server 212 may map the OSC location register to the operations service servers to provide the operations services to the OSCs. The network server 212 will with multiple application servers 202 to route a cell to a specific destination OSC 106 (i.e. multiple OTs). A network server 212 will be able to serve multiple distributed application servers 202 within an OSW 102.

The OSW 102 communicates with both the operations service servers and the OTs of the customer networks. As shown, the OSC 148 may communicate with the OSW 102 via a communication link between the OT 128 and the media server 204 and/or directly with the application server 202 such as via an application-specific user interface. Such communications may be to subscribe to operations services and then to monitor the provisioning of those services, including reviewing account and billing information. Likewise, the OSW 102 may communicate with the operations service servers, including the OASs and OFSs by the network server 212 routing communications via a network gateway 224 that leads to the network core 104 where the OSW resides. The network core 104, such as an IP core, may then be a network capable of routing the communications from the OSW 102 to the individual networks and servers of the provider entities (i.e., OAS 122 of OAP 108, OFS 132 of OFP 118), as well as to other OSWs 228 and of the same or other OSPs 226.

Figure 3:
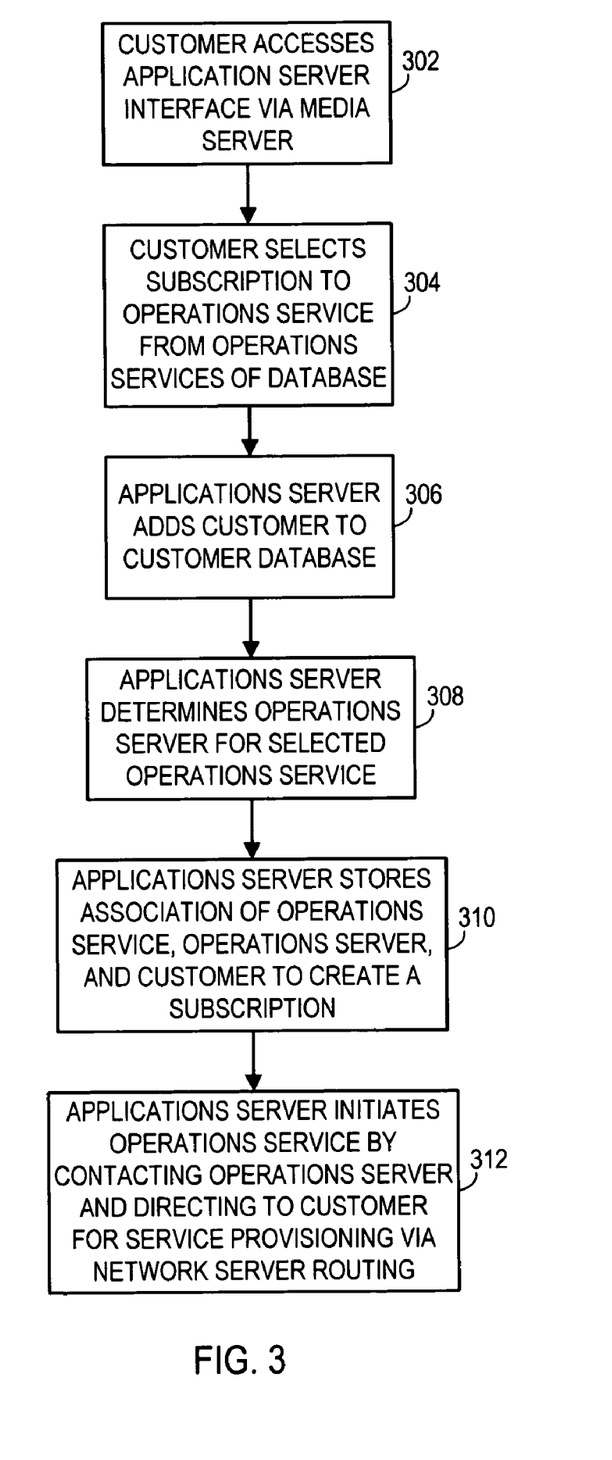
FIG. 3 shows one example of the operations being performed by the operations switch of FIGS. 1 and 1b to establish an operations service for customers.

FIG. 3 illustrates one example of the operations of the OSW 102 to establish the operations services for customer networks. Initially, the customer accesses the OSW 102 at access operation 302, such as by contacting the media server 204 via the web, voice, or video in order to create a subscription for services. The customer then selects the subscription to operations services from the set of operations services made available by the OSW 104 and as defined in the operations services database that is being maintained at selection operation 304.

Upon the application server 202 having received the selection, either directly or through the interaction with the media servers 204, the application server adds the customer to the customer database at customer operation 306. The application server 202 then determines the operations service server for the selected operations service at server operation 308. For example, the application server 202 may find that the customer has chosen an operations application or feature to which there is only a single operations application or feature provider. In that case, the operations service server of that one provider is determined to be the operations service server for this customer request. As another example, the application server 202 may find that the customer has chosen an operations application or feature to which there are multiple operations application or feature providers. In that case, the applications server 202 may apply particular criteria to determine which operations service server should be selected, where the criteria may be to select the provider entity offering the best price for the customer where the provider entities may charge different rates for the same service, or may be to select the provider entity offering the best commission for the OSP that is associating the customer with the operations service.

Upon the application server 202 having determined the appropriate operations service server, the application server 202 creates a subscription association at subscription operation 310. Here, the association includes the operations service selected, the operations service server that has been determined to be the best choice for providing the selected operations service, and the customer information. Upon the subscription being created, the application server 202 then initiates the provisioning of the operations service at routing operation 312. The operations service is provisioned by causing the network server 212 to route a request to the relevant operations service server for the subscription to then direct the operations service server to begin providing the operations service to the customer network of the subscription.

The functions of the various servers including those of the OSW 102 of FIG. 3 and also those of the various operations service servers may be embodied as a computer readable medium, such as storage including magnetic, electronic, and optical formats as well as propagated signals traveling via wired or wireless connections.

Figure 4:
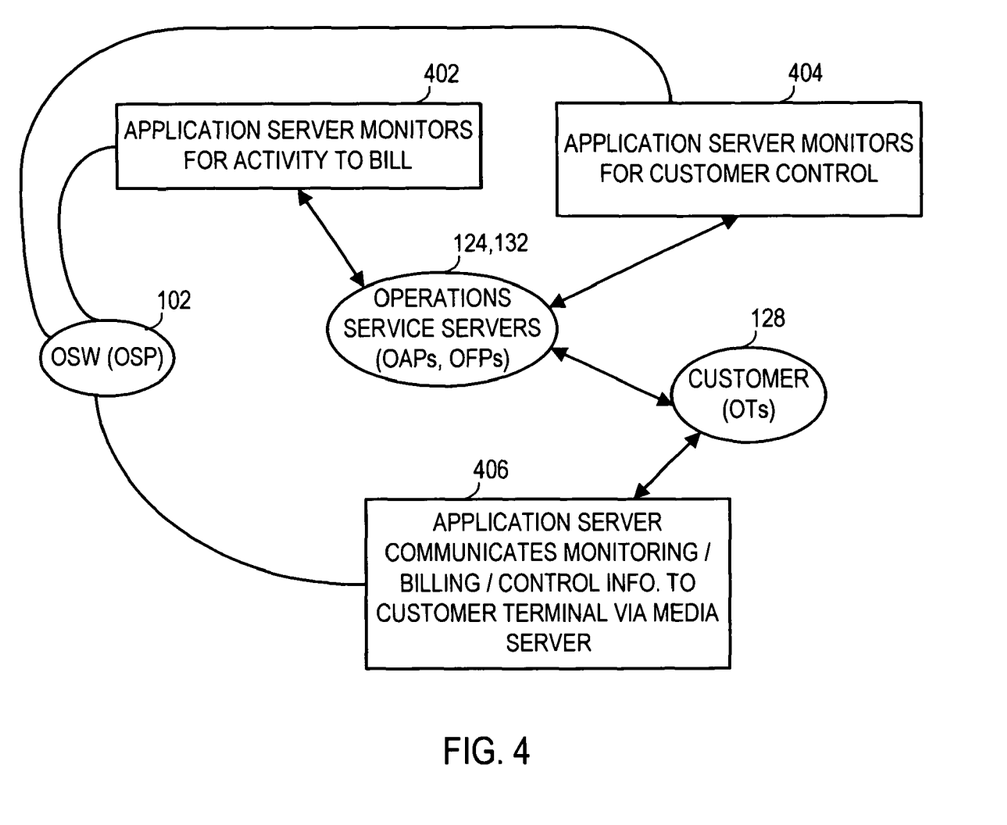
FIG. 4 shows one example of the operations being performed by the operations switch upon the establishment of operations service for customers and the relationship of those operations to the operations service servers and the customer terminal.

FIG. 4 shows an example of the interaction that may occur between the OSW 102, the operations service servers 124, 132, and the customer network 128 while the operations service is being provisioned. At monitoring operation 402, the OSW 102 includes the application server 202 monitoring the operations service servers 124, 132 that are providing operations services for a particular customer in order to determine what the customer should be billed, such as where the operations service is not a fixed charge but varies depending upon the actions taken on behalf of the customer. At monitoring operation 404, the application server 202 monitors for any desired customer control of operations service that may be received and implements any change of the operations service due to the customer control by communicating with the relevant operations service server 124, 132.

The OSW 102 also maintains communications with the customer network 128 by allowing the customer network 128 to access the application server 202 such as via the media server 204 at communication operation 406. Here, the customer may request monitoring information about the operations services being provided, such as to view the manner in which faults have been detected and handled, view the current capacity of the network, view the current status of various network equipment, etc. Furthermore, the customer may request or otherwise be provided with billing information, such as a current account balance. Additionally, the customer may submit control information such as to manipulate the operations service being provided, and where the control information may then be implemented as discussed above for monitor operation 404.

It will be appreciated that through the OSW 102, the customers may request operations services be provided for their networks while the OSW 102 than establishes the requested services by calling upon the appropriate operations service servers available to the OSW 102. Thus, it will further be appreciated that the OSW 102 may establish the same or similar operations services for multiple customers, thereby taking advantage of the ability of the provider entities to offer operations services to multiple networks while providing the multiple customers a centralized point of management for the operations services being provided. The customers are thereby relieved from having to implement such operations services themselves.

Figure 5:
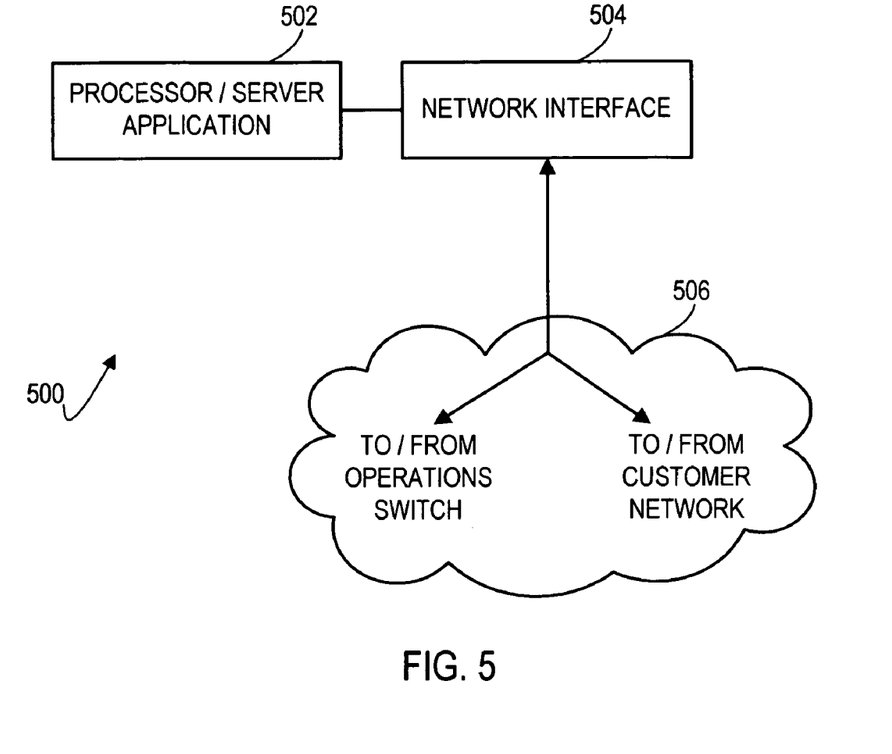
FIG. 5 shows one example of an operations service server.

FIG. 5 shows one exemplary embodiment of an operations service server 500 in accordance with the systems discussed above. The operations service server 500 is a computing system that includes a processor 502 implementing a server application. The processor 502 may be a general purpose programmable processor where the server application is a software application residing on a storage device or in memory that is either external to or internal to the processor 502. Additionally, the operations service server 500 includes a network interface 504, such as an Ethernet interface or other type of interface that couples the operations service server 500 to external networks 506. Within the external networks 506, the operations service server 500 receives requests and provides acknowledgements to the operations switches discussed above. Additionally, the operations service servers establish communication links to customer networks and initiating the operations services over the communication links formed in the external networks 506.

Figure 6:
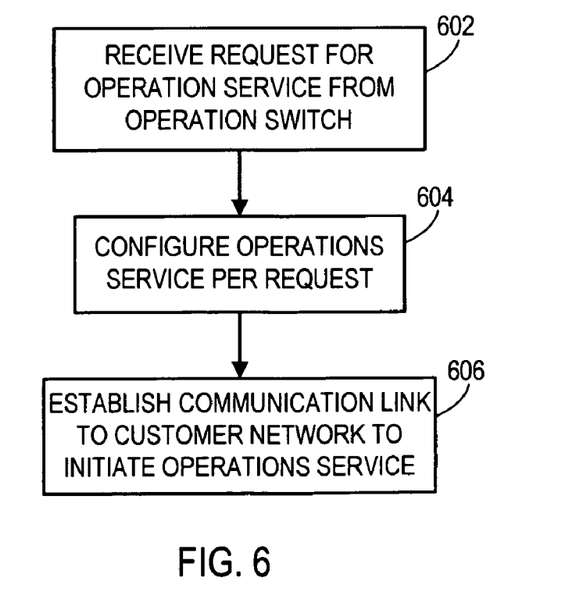
FIG. 6 shows on example of an operational flow of the operations service server of FIG. 5.

FIG. 6 shows on example of an operational flow of an operations service server 500. The operations service server 500 receives an incoming request from the network 506 where the request has originated from an operations switch at a first network address, such as those operation switches discussed above. Presumably, a customer has established communication with the operations switch to request a particular operations service. The request received by the operations service server 500 at request operation 602 is the direct result of that request to the operations switch by the customer. The request provides information necessary for the operations service server 500 to provide the requested service. Namely, the request provides a second network address that corresponds to an entry point to the customer network. Additionally, the request provides an identification of the particular service that has been requested and/or any parameters necessary for providing the service, such as service options that have been pre-selected by the customer when communicating with the operations switch.

After having received the request, the operations service server 500 then configures the operations service per the request at configuration operation 604, including implementing the service application necessary to provide the functions of the requested service in accordance with any options or other configuration information already specified by the request. The operations service server 500 then establishes a communication link by initiating communications with the customer network at the second network address and upon reaching a live address, then beginning the operations service that has been requested over the established communication link at service operation 606. The communication link may be an IP based point-to-point communication that continues so long as the operations service remains active, i.e., until the operations service server receives another request for termination of the operations service or until a natural expiration of the service as may have already been specified in the initial request. Examples of the operations services including operation applications and operation features that may be provided by the operations service server 500 have been set forth above.

While the invention has been particularly shown and described with reference to various embodiments thereof, it will be understood by those skilled in the art that various other changes in the form and details may be made therein without departing from the spirit and scope of the invention.

What is claimed is:

1. An operations switch, comprising:
   (a) an application server adapted for:
      i) creating subscriptions to operations services for users of user networks that are provided to users of user networks from operation service provides via operations service servers;
      ii) maintaining a database including database segments for storing data associated with each of the operation service servers, the user network, and the operations services, wherein the database segment for the user networks maintains the subscriptions and wherein the subscriptions include associations for each of the user network with one or more of the operations services and with one or more of the operations service servers; and
      iii) selecting one or more of the operations service servers to provide the subscribed to operations services to the users based on one or more predetermined criteria, wherein the predetermined criteria include selecting the operations service servers associated with the lowest subscription price charged by the operations service providers and selecting the operations service servers associate with the highest subscription commissions paid to the operations service provider;
   (b) a network server adapted for:
      i) routing communications between the application server and each of the operations services server to initiate the operations services;
      ii) establishing a connection between the operations services servers and the user networks according to the subscriptions; and
   (c) a media server adapted for providing an interface for communicating with the users to:
      i) provide options to the users to select from for the operations services that are available to be subscribed to;
      ii) receive selections from the users for one or more of the provided options; and
      iii) establish, within the database, the subscriptions to the selected operations services for the user networks.

2. The operations switch of claim 1, wherein the network server communicates via an Internet Protocol.

3. The operations switch of claim 1, wherein the media server provides an interactive voice response system for communicating with the users.

4. The operations switch of claim 3, wherein the application service provides announcements regarding the operations services to the user via the interactive voice response system.

5. The operations switch of claim 1, wherein the media server provides an interactive video response system for communications with the users.

6. The operations switch of claim 5, wherein the application server provides announcements regarding the operations services to the user via the interactive video response system.

7. The operations switch of claim 1, wherein the media server provides an interactive web response system for communicating with the users.

8. The operations switch of claim 7, wherein the application server provides announcements regarding the operations services to the users via the web response system.

9. The operations switch of claim 1, wherein the application server implements a billing application to collect billing information for the operations services being provided from the operations service servers to the user networks.

10. The operations switch of claim 1, wherein the operations service servers include operation feature servers and operation application servers.

11. A system comprising:
    (a) an application server adapted for:
       i) maintaining, in a database, a database segment for storing data associated with user networks, including a network address of each of the user networks;
       ii) maintaining, in a database, a database segment of operations service servers and a network address of each operations service server;

iii) maintaining, in the database, a database segment for storing data associated with one ore more operations services that are available to be subscribed to by users of the user networks, including the operations service servers that provide each of the one or more operations services; and iv) selecting one or more of the operations service servers to provide the one or more subscribed to operations services to the users based on one or more predetermined criteria, wherein the predetermined criteria include selecting the one or more operations service servers associated with the lowest subscription price charged by the operations service provider for the subscribed to operations services and selecting the one or more operations service servers associated with the highest subscription commission paid to the operations service providers that provide the operations services for each of the user networks;

(b) a media server adapted for providing an interface for communicating with users of the user networks to:
  i) provide options to the users to select from for one or more of the operations services that are available to be subscribed to, for the user networks;
  receive selections from the users for one or more of the provided options;
  iii) establish, within the database, subscriptions for the selected operations services associated with the selected options or the users networks; and (c) a network server adapted for:
  i) routing communications between the application server and each of the operations service servers to initiate the operations services; and
  establishing a connection between the operations service servers and the user networks according to the subscriptions; and (d) a plurality of operations service servers in communication with the application server via the network server, wherein the application server is interconnected to a plurality of user network, wherein the application server performs operations services management by establishing a communication link between a first operations service server of the plurality of operations service servers and a first user network of the plurality of user networks upon the application server receiving a request from the first user network for an operations service that is provided by the first operations service server.

12. The system of claim 11, wherein the network server communicates via an Internet Protocol.

13. The system of claim 11, wherein the media server provides an interactive voice response system for communicating with the users.

14. The system of claim 11, wherein the media server provides an interactive video response system for communicating with the users.

15. The system of claim 11, wherein the media server provides an interactive web response system for communicating with the users.

16. The system of claim 11, wherein the application server implements a billing application to collect billing information for an operations service being provided from an operations service server to a user network.

17. A non-transitory computer readable medium having instructions to perform acts executed by a processor that comprise:
  (a) storing data associated with operations service servers, including the network address of each of the operators service servers;
  (b) storing data associated with user networks, including the network address of each of the user networks;
  (c) storing data associated with operations services that are available to be subscribed to and the operations service servers that provide each of the operations services;
  (d) storing subscriptions by associating each of the user networks with operations services subscribed to by each of the user networks and with the operations service servers that provide the operations services for each of the user networks;
  (e) providing routing instructions to each of the operations service servers to initiate the operations services by requesting a connection between the operations service servers and the user networks within the database of user networks; and
  (f) selecting one or more of the operations service servers to provide the subscribed to operations services to the users based on one or more predetermined criteria, wherein the predetermined criteria includes selecting the operations service servers associated with the lowest subscription price from the operators service providers and selecting the operations service servers associated with the highest subscription commissions paid to the corresponding service providers.

18. The non-transitory computer readable medium of claim 17, further having instructions to perform acts comprising:
  (a) providing announcements regarding operations services to the users via an interactive voice response system;
  (b) providing announcements regarding operations services to the users via an interactive video response system; and
  (c) providing announcements regarding operations services to the users via a web response system.

19. The non-transitory computer readable medium of claim 17, further having instructions to perform acts comprising collecting billing information for the operations service being provided from an operations service server to a user network.

20. The non-transitory computer readable medium of claim 17, further having instructions to perform acts comprising providing a connection from a user network to an operations service server, providing network monitoring service, and providing an interface to the user network for monitoring network status as determined by the network monitoring device.

* * * * *